(12) United States Patent
Yadav et al.

(10) Patent No.: US 10,506,266 B2
(45) Date of Patent: Dec. 10, 2019

(54) RESOURCE AWARE VIDEO PROCESSOR

(71) Applicant: Harmonic, Inc., San Jose, CA (US)

(72) Inventors: Ganesh Yadav, Milpitas, CA (US); Hemamalini Mandlekar, San Jose, CA (US); Rafik Mikhael, Livermore, CA (US)

(73) Assignee: Harmonic, Inc., San Jose, CA (US)

( * ) Notice: Subject to any disclaimer, the term of this patent is extended or adjusted under 35 U.S.C. 154(b) by 434 days.

(21) Appl. No.: 15/373,235

(22) Filed: Dec. 8, 2016

(65) Prior Publication Data

US 2017/0164018 A1    Jun. 8, 2017

Related U.S. Application Data

(60) Provisional application No. 62/264,716, filed on Dec. 8, 2015.

(51) Int. Cl.
*H04N 21/2385* (2011.01)
*H04N 21/234* (2011.01)
(Continued)

(52) U.S. Cl.
CPC ........... *H04N 21/2385* (2013.01); *H04N 7/06* (2013.01); *H04N 19/00* (2013.01); *H04N 19/188* (2014.11);
(Continued)

(58) Field of Classification Search
CPC ......... H04N 21/2385; H04N 21/23418; H04N 21/21815; H04N 7/06; H04N 7/01;
(Continued)

(56) References Cited

U.S. PATENT DOCUMENTS 6,055,270 A    4/2000  Ozkan et al.
9,417,902 B1 *  8/2016  Noonan .............. G06F 9/45533
(Continued)

FOREIGN PATENT DOCUMENTS

WO    WO2017/100474 A1    6/2017

OTHER PUBLICATIONS

International Searching Authority, Notification of Transmittal of the International Search Report and the Written Opinion of the International Searching Authority, or the Declaration dated Feb. 21, 2017 for International Application No. PCT/US2016/065658, International Filing Date Dec. 8, 2016; 15 pages.

*Primary Examiner* — Michael E Teitelbaum
*Assistant Examiner* — Sean N. Haiem
(74) *Attorney, Agent, or Firm* — Brokaw Patent Law PC; Christopher J. Brokaw

(57) ABSTRACT

Approaches for dynamically allocating CPU cycle resources to a video encoder. A resource allocator assesses an amount of available CPU cycle resources on the hardware device on which it executes. The resource allocator determines that a change in the amount of available CPU cycle resources has occurred. The resource allocator, adjusts, in real-time, which particular cycle profile, in a plurality of cycle profiles, is assigned to at least one of a plurality of video modules. The plurality of cycle profiles each allocate, to video modules, a particular amount CPU cycle resources for processing digital video. The plurality of cycle profiles also each specify a set of configuration settings and are arranged in a sequence based upon the video quality and density achievable by video modules using configuration settings associated with each cycle profile when processing digital video.

20 Claims, 5 Drawing Sheets

(51) Int. Cl.
*H04N 7/06* (2006.01)
*H04N 19/00* (2014.01)
*H04N 19/18* (2014.01)
*H04N 19/169* (2014.01)

(52) U.S. Cl.
CPC ... *H04N 19/1887* (2014.11); *H04N 21/23418* (2013.01)

(58) Field of Classification Search
CPC .... H04N 7/0806; H04N 7/6143; H04N 19/00; H04N 19/188; H04N 19/1887
USPC ................. 375/240.16, 240.02; 718/1, 103; 382/236; 713/300
See application file for complete search history.

(56) References Cited

U.S. PATENT DOCUMENTS

| | | | |
|---|---|---|---|
| 10,104,405 B1* | 10/2018 | Haltmayer | H04N 21/2385 |
| 2003/0007516 A1* | 1/2003 | Abramov | H04N 21/2365 370/535 |
| 2005/0289362 A1* | 12/2005 | Merkin | G06F 1/3203 713/300 |
| 2010/0104017 A1* | 4/2010 | Faerber | H04N 7/52 375/240.16 |
| 2012/0051420 A1 | 3/2012 | Chen | |
| 2012/0151065 A1* | 6/2012 | Rintaluoma | H04N 19/127 709/226 |
| 2014/0112384 A1* | 4/2014 | Van Veldhuisen | H04N 21/23655 375/240.02 |
| 2015/0237356 A1* | 8/2015 | Wu | H04N 19/70 375/240.03 |
| 2015/0254094 A1* | 9/2015 | Cao | G06F 16/24568 718/1 |
| 2015/0326888 A1* | 11/2015 | Jia | H04N 19/105 382/236 |
| 2016/0092108 A1* | 3/2016 | Karaje | G06F 3/061 718/103 |

* cited by examiner

RESOURCE AWARE VIDEO PROCESSOR

CLAIM OF PRIORITY AND RELATED APPLICATION DATA

This application claims priority to U.S. Provisional Patent Application Ser. No. 62/264,716, entitled "Resource Aware Video Processor," filed on Dec. 8, 2015, the entire disclosure of which is hereby incorporated by reference for all purposes as if fully set forth herein.

This application is related to U.S. patent application Ser. No. 14/961,239, entitled "Dynamic Allocation of CPU Cycles in Video Streaming Processing," filed on Dec. 7, 2015, the entire disclosure of which is hereby incorporated by reference for all purposes as if fully set forth herein.

FIELD OF THE INVENTION

Embodiments of the invention relate to optimizing the allocation of hardware resources to software responsible for processing digital video.

BACKGROUND

In statistical multiplexing, the number of bits allocated to each of a plurality of digital video channels is dynamically adjusted many times a second based on the complexity of the digital video carried by each channel. The complexity of digital video is a measure of how much data (or 'bits') is required to describe how to display the digital video. When a particular channel requires an increase in bits to sufficiently describe the complexity of digital video carried thereby, additional bits can be allocated to that channel from another channel which is not using all of its assigned bits at that moment.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for dynamically allocating CPU cycles for use in processing digital video are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

A digital video encoder is hardware component, configured with software, which converts digital video from one format to another. A digital video encoder may support encoding more than one digital video stream at a time. An example of a digital video encoder is the Electra 8100, which is a single rack-unit (1-RU) encoder with a multi-standard, multi-service and multi-channel capability available from Harmonic, Inc. of San Jose, Calif. The Electra 8100 supports encoding 4 channels simultaneously per chassis (1-RU).

A digital video encoder may comprise multiple central processing units (CPUs or cores). For example, the Electra 8100 encoder includes four CPUs. Software responsible for encoding functionality is typically written to execute on a single CPU. Therefore, four difference instances of the encoding software (individually referred to as an "encoding module") may execute on the Electra 8100, each of which is designed to execute upon a separate CPU. Accordingly, in the prior art, each encoding module is designed to execute instructions using a single CPU.

Embodiments of the invention enable the cycles of each CPU of a digital video encoder to be more efficiently utilized by software modules executing thereon. Embodiments of the invention optimize the use of computer resources, without heavy user intervention and configuration, to achieve the best video quality for a channel under a given configuration adaptively, thereby seeking to minimize or eliminate any loss of frames when CPU cycle use temporarily spikes. If available CPU cycles are plentiful, embodiments may allocate additional CPU cycles to an encoding module than what is generally assigned by default to support a real-time high video quality mode to further increase and enhance video quality.

Note that while embodiments will be chiefly described with respect to encoding modules, the techniques discussed herein may also be used in conjunction with other types of video processing software components, such as, but not limited to, digital video transcoder modules responding for performing transcoding functionality and digital video decoder modules responsible for performing decoding functionality. Indeed, embodiments of the invention may be employed with any type of software for processing digital video.

System Overview

Figure 1:
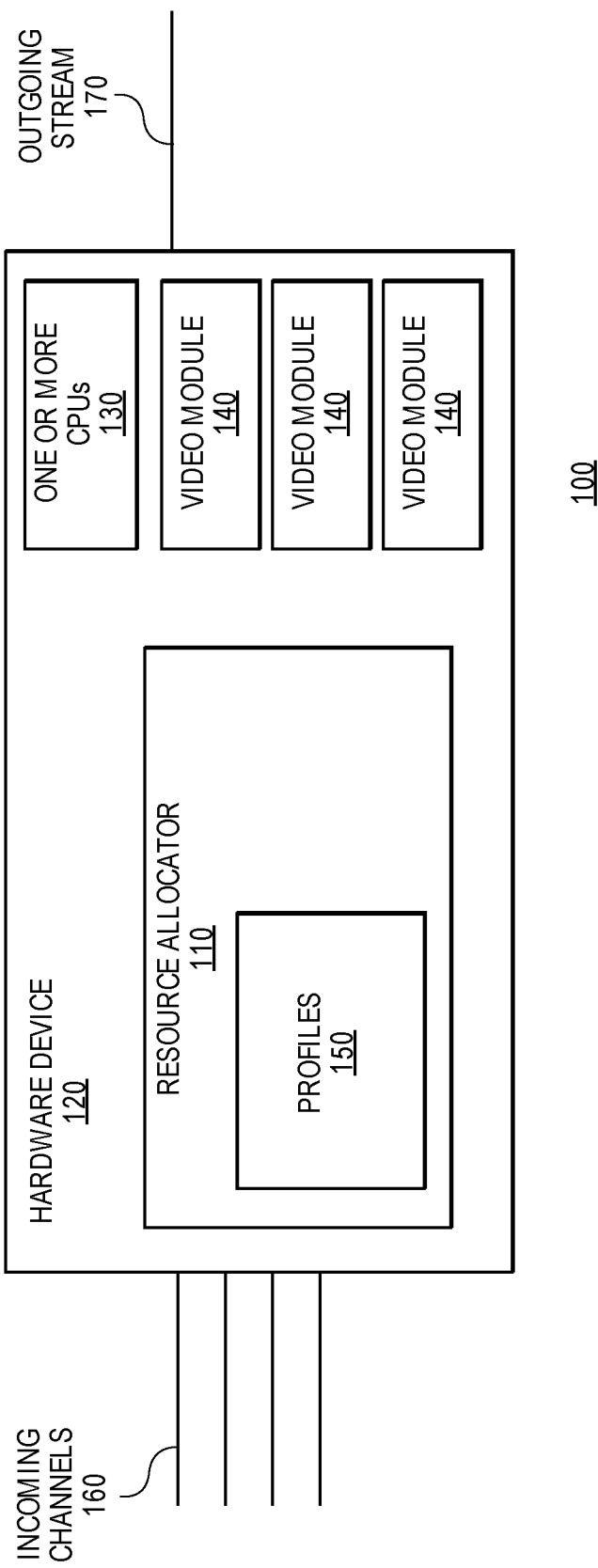
FIG. 1 is a block diagram of a system that includes resource allocator according to an embodiment of the invention.

FIG. 1 is a block diagram of a system 100 that includes resource allocator 110 according to an embodiment of the invention. Resource allocator 110, as broadly used herein, refers to a single software component, or two or more software components operating in tandem, responsible for assigning the use of cycles of one or more CPUs 130 of hardware device 120 to each of a plurality of video processing software modules 140 performing work on digital video. Non-limiting, illustrative examples of video processing software modules 140 (or simply video modules 140) include digital video encoder modules, digital video decoder modules, and digital video transcoder modules.

Hardware device 120 may correspond to any physical device which executes video processing software modules 130. For example, hardware device 120 may correspond to the Electra 8100, available from Harmonic, Inc. of San Jose, Calif. Hardware device 120 receives a plurality of incoming channels 160 which individual carry digital video. Video modules 140 executing on hardware device perform work on the incoming channels, such as encoding, decoding, or transcoding the digital video carried by the incoming channels 160. Video modules 140 may support a variety of different video protocols, including but not limited to H.264/AVC, H.265/HEVC, H.262/MPEG2, and VP9. The digital video content processed by video modules 140 is carried by outgoing stream 170.

Resource allocator 110 maintains a set of cycle profiles 150. Each of the set of cycle profiles 150 may be assigned by resource allocator 110 to each video module 130 executing on hardware device 120. A cycle profile 150 indicates how many cycles of CPUs 130 are needed by a particular video module 140 to perform work to produce various levels of video quality. A cycle profile 150 may also identify, or implicitly require, a set of hardware and software resources associated with processing digital video to obtain a specified level of video and/or density. The particular cycle profile 150 assigned to a particular video module 140 by resource allocator 110 may vary over time depending on the content type on each service and changes in the amount of available CPU cycle resources. Resource allocator 110 also monitors the amount of available CPU cycle resources of the hardware device on which it executes.

Resource Allocator and the Control Loop

Resource allocator 110 regulates how many CPU cycle resources are allocated to a particular video module 140 responsible for processing a channel of incoming channels 160. In an embodiment, resource allocator 110 improves the quality of digital video carried by incoming channels 160 when cycles of CPUs 130 (i.e., "cycle resources") are made available to a given video module 140. Resource allocator 110 and each video module 140 remain in constant communication with each other in a control loop, as both cycle resources and video complexity will rapidly fluctuate over time. Consequently, based on information received from video modules 140, resource allocator 110 may make adjustments to how cycle resources are allocated to each video module 140. Also, based on information received from resource allocator 110, video modules 140 may make adjustments to how digital video is processed (for example, when additional cycle resources are available to a particular video module 140, digital video may be processed in a different manner by that video module 140 to take advantage of additional cycles resources as compared to when less cycle resources are available).

Each video module 140 may be configured to operate in one of a plurality of different modes. Examples of two such modes are a high density mode (HD mode) and a high quality mode (VQ mode). HD mode may correspond to a configuration that favors using less data (or bits) to represent a frame of digital video to minimize the bandwidth necessary to carry the resulting video stream, and HQ mode may correspond to a configuration that favors using more data (or bits) to represent a frame of digital video to maximize video quality. Other modes may correspond to different preferences how digital video should be encoded or processed. The mode in which a particular video module 140 operates may be configured by a user through a user interface (UI) exposed by video module 140. Before embodiments of the invention, typically such modes are static in that once a user configures a particular video module 140 to operate in a particular mode, that video module 140 continues to operate in that mode unless reconfigured by a user.

According to one embodiment, an aim of resource allocator 110 is to ensure that the video quality of digital video carried by outgoing stream 170 is comparable to or better than the video quality traditionally associated with a HD mode. Previously in the prior art, when instructing a video encoder to encode video according to a particular mode, the particular way in which the video encoder operated did not deviate or change from the selected mode. In contrast, resource allocator 110 of an embodiment responds to the availability of cycle resources and accordingly adjusts the operating of video modules 140 based on the available cycle resources. To do so, resource allocator 110 dynamically adjusts the configuration settings of video modules 140 in real-time in response to changes in cycle resources. In doing so, the density of single bitrate (SBR) may be improved without overly affecting the video quality, as the video quality may be comparable to high video quality (VQ) mode while operating in high density (HD) mode. Embodiments may dynamically adjust the operation of each video module 140 so that the video module 140 changes its operational behavior dynamically in real-time, e.g., a particular video module 140 may alter its behavior to fluctuate between operating in a HD mode and a VQ mode, for example.

Embodiments of the invention may dynamically adjust the operation of a video module 140 in response to changes in available cycle resources in different ways. The operation of a video module 140 may be adjusted or regulated by embodiments in its entirety or in just how the video module processes a particular digital video frame or macroblock (MB). Changing the operational behavior on a per video module 140 basis and on a per MB basis represent the extremities on either side of regulation, whereas changing the behavior of how the video module 140 processes a single frame of digital video represents a middle ground in terms of control and stability. Also, adjusting the behavior of how the video module 140 processes a single frame of digital video allows for easier control over most of the settings that can be adjusted to achieve a VQ and cycles tradeoff with granularity that is neither too coarse nor too fine grained.

Metrics

Resource allocator 110 may use one or more metrics to determine how to allocate cycle resources to each of video modules 140. Resource allocator 110 may use such metrics in adjusting the density at which a video module 140 processes video or tuning the quality of digital video processed by a video module 140. The density or quality of video processed by a video module 140 may be improved or increased when additional cycle resources are available to the video module 140 or reduced when additional cycle resources are unavailable. Note that an improvement in the speed of a video module 140, which would result in a relaxation of density at which digital video is processed, need only be maintained while cycles resources is deemed an issue due to a risk of loss of quality in the output of that video module 140.

Metrics are useful as they allow potential issues to be identified as early as possible. The smoother the metric is, the more reliable the metric is in terms of control and stability. Transient problems can be identified and addressed by filtering an underlying metric, although at the cost of reliability. At the same time, a metric used by an embodiment should not be too transient or unreliable. Several metrics which may be used by embodiments to determine how to allocate cycle resources to each of video modules 140 shall be discussed below.

Sender Delta Metric

Hardware device 120 must transmit processed digital video on outgoing stream 170 in a timely manner. When a particular video module 140 is overloaded (i.e., the particular video module 140 cannot operate in real-time or in the required time-frame for the workload presented), that video module 140 produces failures, such as an underflow on outgoing stream 170.

The sender delta metric relies on the Video Buffer Verifier (VBV) model. The encoder may employ this model to ensure that there are no underflows or overflows at the decoder. The VBV model typically defines the decoder behavior in terms of three parameters: (1) DTS—the decode time stamp, (2) PTS—the presentation timestamp, and (3) MaxVbvDelay—the maximum Vbv delay. The fullness of the multiplexer outgoing buffer (TSMOB) is equal to MaxVbvDelay−ActualVbvDelay+Delta. Ideally, TSMOB should be 0 when there is no processing delay and Delta is 0.

Figure 2:
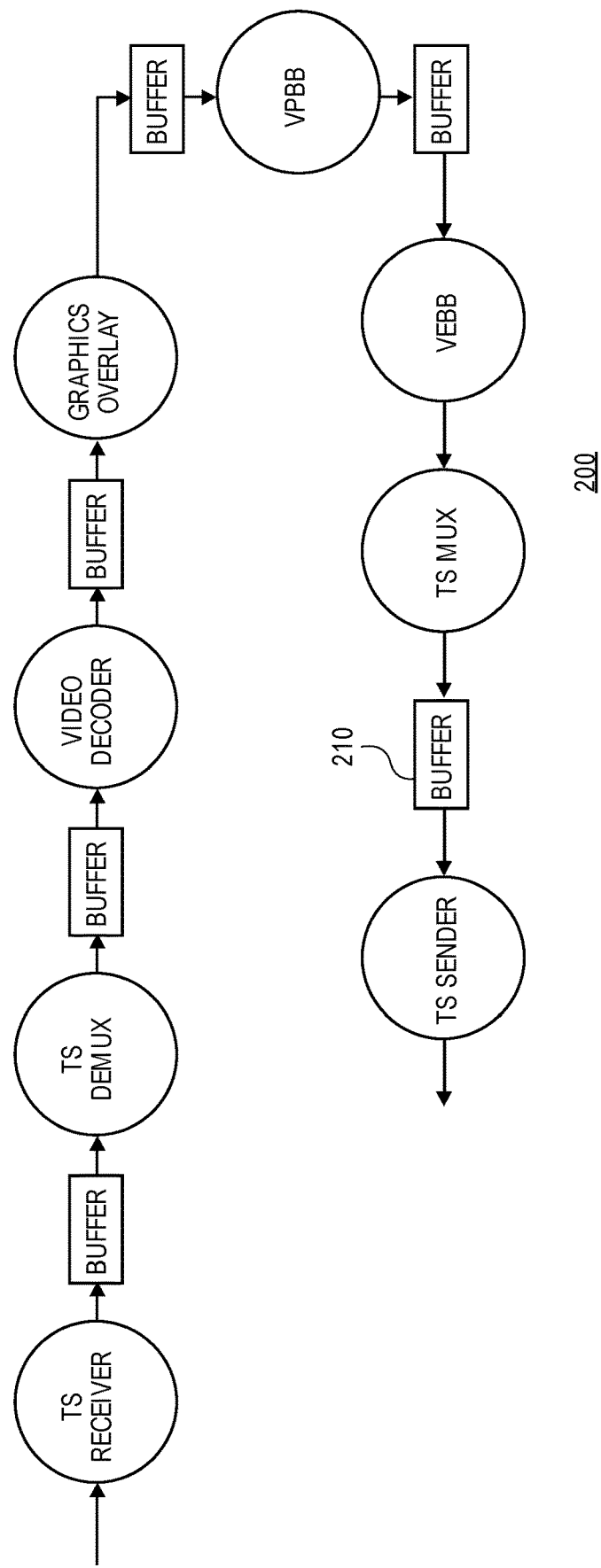
FIG. 2 depicts a delivery buffer in a encoding/transcoding system according to an embodiment of the invention.

When a particular video module 140 encoder falls behind, a buffer (termed a "sender buffer"), physically located on hardware device 120 and which stores digital video frames to be carried by outgoing stream 170, underflows. FIG. 2 depicts sender buffer 210 in an encoding/transcoding system according to an embodiment of the invention. As shown in FIG. 2, sender buffer 210 stores content output by a multiplexer but not transmitted over outgoing stream 170. Thus, when a particular video module 140 encoder falls behind, sender buffer 210 will underflow with respect to the content product by that video module 140.

Figure 3:
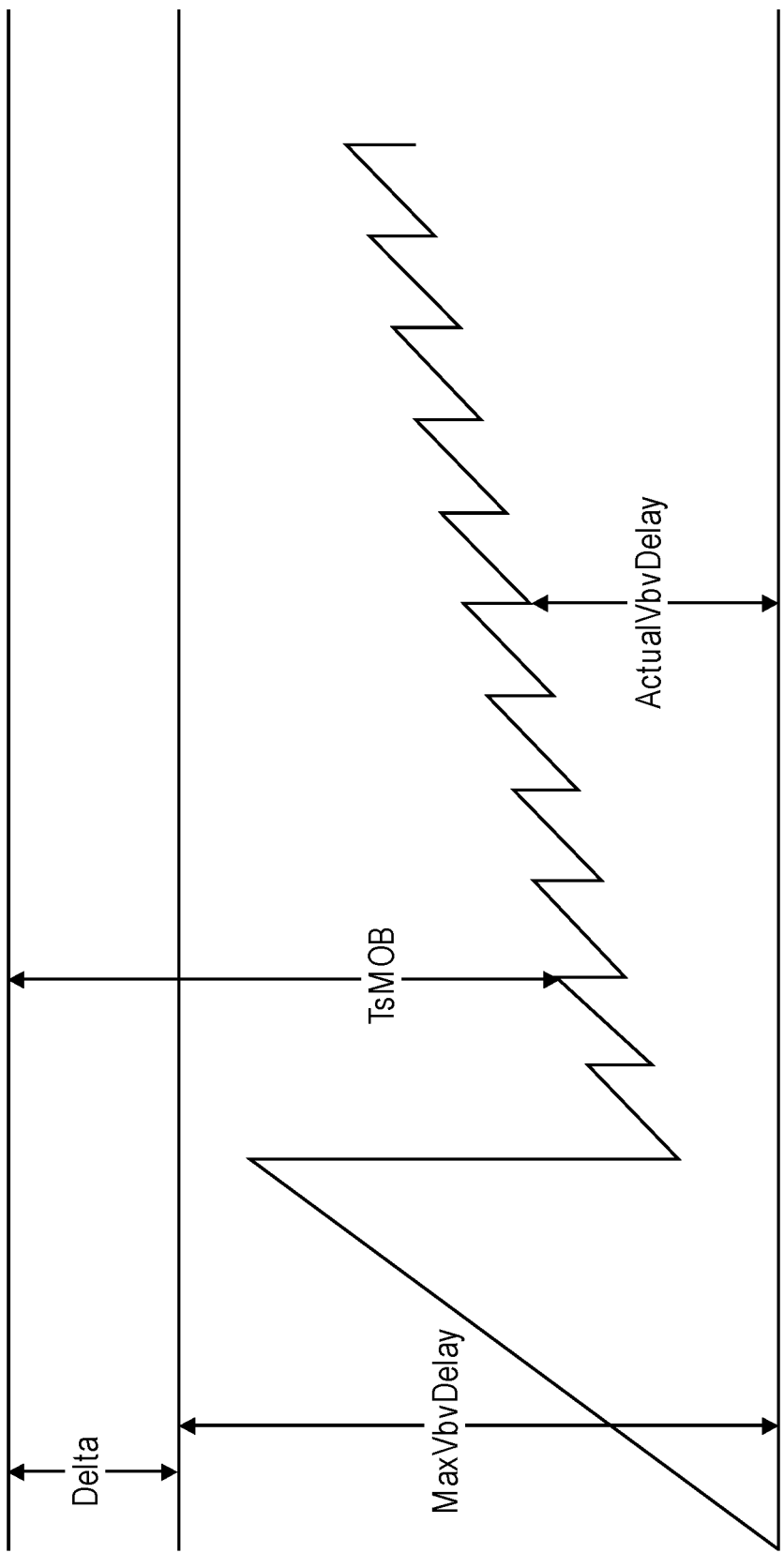
FIG. 3 is an illustration of the values of ActualVbvDelay, Delta, ActualVbvDelay, and TSMOB according to an embodiment of the invention.

At the time hardware device 120 starts transmitting picture (N) on outgoing stream 170, the amount of content stored in sender buffer 210 should be MaxVbvDelay−ActualVbvDelay+Delta, where MaxVbvDelay is the maximum Video Buffering Verifier (VBV) delay, where ActualVbvDelay is the actual Video Buffering Verifier (VBV) delay, and where Delta is the amount of time we add to the end-to-end delay to absorb variations in processing time in our software system. In a practical implementation, Delta may be equal to or about 0.6 seconds. Typically, ActualVbvDelay is less than or equal to one second. FIG. 3 is an illustration of the values of ActualVbvDelay, Delta, and ActualVbvDelay according to an embodiment of the invention.

Note that the desired amount of content to be stored in sender buffer 210 is measured in seconds rather than bits. To calculate how much content should be stored in the sender buffer 210 in bits for use in a constant bit rate (CBR) operational mode, the content to be stored in sender buffer 210 as measured in time is multiplied by the bit-rate. The desired amount of content to be stored in sender buffer 210 for a variable bit rate (VBR) operational mode may be calculated as:

Actual VbvDelay(Picture(N))=DTS(N)−PCR(start transmitting Picture(N)), where DTS is the decode time stamp and PCR is the real-time clock.

Delta(start transmitting Picture(N))=TSMOBfullness (start Picture(N))+DTS(N)−PCR(N)−MaxVbvDelay, where Delta (N) is the actual amount of "extra time" added to the transmission of Picture(N) to absorb processing time variations. The value of Delta (N) is a metric that can be used for the control loop of an embodiment. Typically, the value of Delta is greater than 0.6 seconds in cases where cycles are not an issue. The value of Delta starts falling below 0.6 seconds in cases where cycle resources for a video module 140 are a potential issue. When there is no more content stored in the delivery buffer (i.e. TSMOB=0), the particular video module 140 stops sending packets. However, this condition is not tied to a particular negative value of Delta, since it is VBV dependent.

Leaky Bucket Fall Behind Accumulation

The 'leaky bucket fall behind' metric accumulates the differences between encoding time per picture with respect to the expected encode time per picture. The expected encode time per picture is defined by the difference in the decode time stamp (DTS) across two pictures in 27 MHz clock ticks. The actual encode time is measured as the encoding time using a high precision clock by taking a snapshot in place (single point on a circle to measure roundtrip time) to measure the difference in cycles consumed from when the last picture started encoding to the time when the next picture started encoding or the previous picture finished encoding.

CTS(N)=coding timestamp of the picture N as a snapshot in clock_gettime( )

DTS(N)=decode timestamp of the picture N

DTS(N)=DTS(N−1)+27×10$^6$/picture_rate where DTS(0)=0

In an embodiment, the variable picture_rate may be defined based on various formats as shown in Table 1 below.

TABLE 1

| Format | Picture Coding | Picture_rate |
| --- | --- | --- |
| 1080i29.97 | Field coded picture | 59.94 |
| 1080i29.97 | Frame coded picture | 29.97 |
| 1080p59.94, 720p59.94 | Frame coded picture | 59.94 |
| 1080p23.97 | Frame coded picture | 23.97 |

The change in certain attributes may be calculated as follows:

$$\Delta DTS(N) = DTS(N) - DTS(N-1)$$

$$\Delta CTS(N) = CTS(N) - CTS(N-1)$$
$$= \text{encode\_time}[n]$$

fall behind ticks=fb_ticks(N)=Σ(ΔCTS(k)−ΔDTS(k)), for k=0 to N

To avoid being anchored to past fall behind values, fb-ticks[N] may be calculated by:

fb-ticks[N]=(ΔCTS(N)−ΔDTS(N))+(32767*fb_ticks(N−1))/32768

'Fall behind' indicates whether a particular video module 140 (e.g., an encoder) is running faster or slower than real-time up to the current picture. For a large number of pictures, Σfb_ticks[k]→0, for k=0 to a large number of pictures.

Calculating the value of ΔCTS for a given picture represents the time spent on encoding that picture. Note that fb_ticks keeps monotonically increasing when a video module 140 is running slow than real-time (i.e., fall behind is accumulating) and recover when there is no fall behind. Typically, fb_ticks is less than 0.1 seconds for cases of no fall behind. Fb_ticks start increasing beyond 0.1 seconds for cases of fall behind.

Table 2 elaborates upon how the 'leaky bucket fall behind' metric may be used to measure how much a particular video module 140 may be falling behind in assigned work.

TABLE 2

All timestamps in or normalized to 27 MHz clock.

| | | | | | | |
|---|---|---|---|---|---|---|
| CTS | coding timestamp - timestamp for start coding the picture. This needs to be snapshot in one place, either before start coding the picture or before outputting the bitstream of the picture. | | | | | |
| FB | Fallbehind clock ticks. Fall behind in 27 Mhz clock ticks | | | | | |
| Decoder order | N − 10 | N − 9 | N − 8 | . . . N − 1 | N | N + 1 |
| DTS(N) | DTS((N − 10) | DTS((N − 9) | . . . | . . . . . . | DTS((N) | . . . |
| CT(N) | CT(N − 10) | CT(N − 9) | . . . | . . . . . . | CT(N) | . . . |
| Delta(CT(N)) | CT(N − 10) − CT(N − 11) | CT(N − 9) − CT(N − 10) | . . . | . . . . . . | CT(N) − CT(N − 1) | . . . |
| Delta(DTS(N)) | DTS(N − 10) − DTS(N − 11) | DTS(N − 9) − DTS(N − 10) | . . . | . . . . . . | DTS(N) − DTS(N − 1) | . . . |
| FB(N) = FB(N − 1) + Delta(CT(N)) − Delta(DTS(N)) | FB(N − 11) + Delta(CT(N − 10)) − Delta (DTS(N − 10)) | FB(N − 10) + Delta(CT(N − 9)) − Delta (DTS(N − 9)) | . . . | . . . . . . | FB(N − 1) + Delta(CT(N)) − Delta (DTS(N)) | . . . |

Fall Behind Compensated Delta

Embodiments of the invention may also use another metric to measure much a particular video module 140 (which may be, but need not be, an encoder) is falling behind. This metric, referred to a "fall behind compensated delta," may be calculated as Delta_minus_fb_ticks[n]=Delta [n]−fb_ticks[n]. Typically, when the encoder begins to falls behind, fb_ticks and Delta move opposite to one another; however, fb_ticks and Delta do not move in exact proportion in opposition to each other. Fb_ticks moves a little earlier than Delta providing a little more headroom. fb_ticks is not bound by recovery in case something goes wrong in the Delta recovery mechanism. 'Fall behind compensated Delta' provides a compensated measure when Delta starts falling due to encoder fall behind.

Making Adjustments Based on Available CPU Resources

Embodiments of the invention allow video modules 140 to make adjustments in how digital video is processed when the amount of available CPU cycle resources changes. For example, embodiments may support a plurality of different cycle profiles 150. Each cycle profile may express a different level of quality and density at which digital video should be processed.

Figure 4:
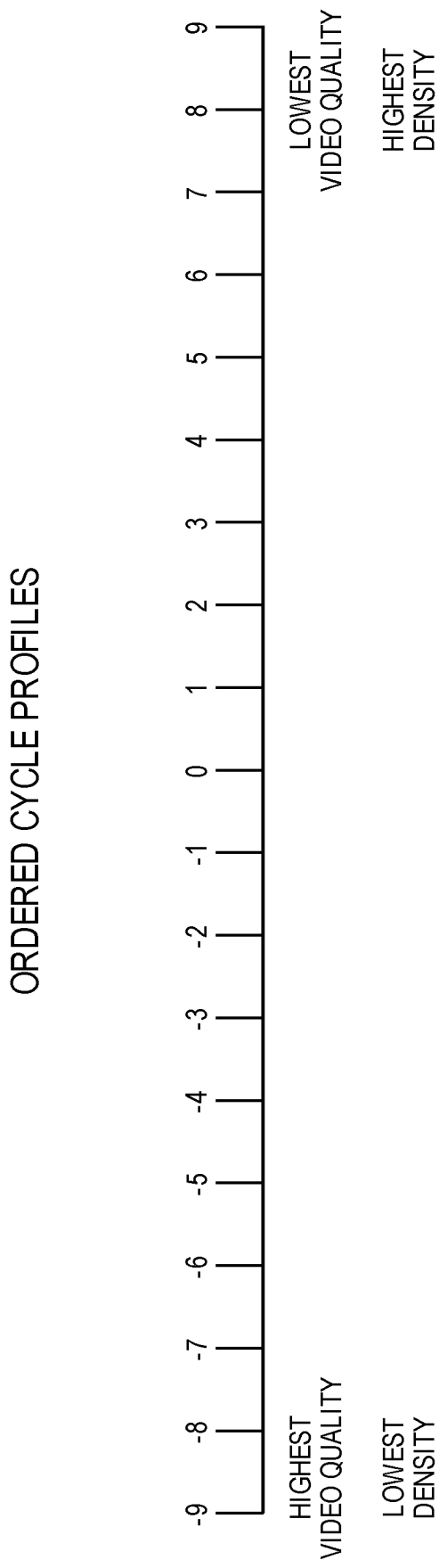
FIG. 4 is an illustration depicting an arrangement of cycle profiles 150 according to an embodiment of the invention.

Cycle profiles 150 may be arranged in a logical sequence based on the consequences of their application upon processing digital video. FIG. 4 is an illustration depicting an arrangement of cycle profiles 150 according to an embodiment of the invention. FIG. 4 depicts a series of numbers ranging from −9 to 9. Each number is associated a different cycle profile (the specifics of which are not depicted in FIG. 4). As shown in FIG. 4, the smallest number in the arrangement (i.e., −9) is associated with the cycle profile producing the highest quality and lowest density digital video, while the highest number in the arrangement (i.e., 9) is associated with the cycle profile producing the lowest quality and highest density digital video. Each cycle profile associated with an integer between the two extremes (−9 and 9) is arranged based on its relative impact. For example, the settings of the cycle profile associated with 2, when applied to a particular video module 140, produce digital video which is slighter lower quality, but higher in density, than the settings of the cycle profile associated with 1 when applied to a particular video module 140. As another example, the settings of the cycle profile associated with −5, when applied to a particular video module 140, produce digital video which is slighter lower quality, but higher in density, than the settings of the cycle profile associated with −6 when applied to a particular video module 140.

Embodiments of the invention attempt to select a particular cycle profile 150 for use by a particular video module 150 in such a manner that they provide as many CPU cycles as quickly as possible while minimizing the impact on video quality as much as possible. As a result, the best tradeoff is made for all video modules 140. If the amount of available cycle resources is sufficient, then the quality of digital video is maximized for all video modules 140 within the cycle budget. However, if the amount of available cycle resources is such that two or more video modules 140 require the same cycle resources to enable those video modules 140 to produce the highest quality video, then resource allocator 110 selects and assigns the best compromise cycles profile to maximize video quality, to the extent possible, for those video modules 140.

Embodiments also seek to minimize the speed at which video quality degrades such that the impact to video quality is not that high, or noticeable to the viewer, when a cycle profile for a particular video module 140 is tuned or adjusted one or more increments, e.g., as shown in FIG. 4, switching from the cycle profile 150 associated with a 2 to the cycle profile 150 associated with a 3, and thereafter switching to the cycle profile associated with a 4.

Note that while FIG. 4 depicts 19 cycle profiles arranged from −9 to 9, the particular number of individual cycle profiles 150 and the identifiers used to identify particular cycle profiles 150 (for example, in FIG. 4, numbers ranging from −9 to 9 are used to identify individual profiles) may vary from implementation to implementation.

To illustrate a concrete example, Table 3 below illustrates certain settings and characteristics of cycle profiles of an embodiment. The specific cycle profiles depicted in Table 3 are arranged from highest video quality/lowest density (cycle profile 1) to lowest video quality/highest density (cycle profile 7).

TABLE 3

| Cycle profile | Settings | Comments |
|---|---|---|
| 1 | Disable pre-processing filters | Disables pre-processing filters. |
| 2 | rdo_params.fast_inter = AVC_FastInter_EnhancedHighDensity | AVC_FastInter_EnhancedHighDensity |
| 3 | me_params.subpel_mode = AVC_HalfPel | AVC_HalfPel |
| 4 | ip_params.use_inter_4×4 = False<br>ip_params.use_inter_8×8 = False<br>ip_params.use_inter_big = False | no Intra in P/B pictures |
| 5 | ip_params.use_intra_4×4 = False<br>ip_params.use_intra_8×8 = False<br>transform = AVC_Transform_4×4_only | no Intra 4 × 4, 8 × 8 in I pics, no tr8 × 8 |
| 6 | me_params.subblock_mode = AVC_Blocks_16×16 | AVC_Blocks_16×16 |
| 7 | me_params.subpel_mode = AVC_FullPel | AVC_FullPel |
| 8 | me_params.weighted_pred = AVC_WeightedPred_Off<br>use_adap_quant_offset = 0<br>use_face_detection = 0;<br>use_edge_detection = 0;<br>use_logo_detection = 0;<br>memset(rc_params.masking_strength, 0, sizeof(rc_params.masking_strength))<br>i_deflicker_strength = 0 | face/edge/logo/deflicker |
| 9 | deblock_params.mode = AVC_DeblockDisable | Deblocking |

As another concrete example, Table 4 below illustrates certain settings and characteristics of cycle profiles of an embodiment. The specific cycle profiles depicted in Table 4 are arranged from lowest video quality/highest density (cycle profile −1) to highest video quality/lowest density (cycle profile −7).

TABLE 4

| Cycle profile | Settings | Comments |
|---|---|---|
| −1 | Enable pre-processing filters/De-interlacing filter HighQuality | Enables pre-processing filters. Uses higher quality deinterlacing filter for cases where the source is interlaced and the output is progressive |
| −2 | rdo_params.fast_inter = AVC_FastInter_EnhancedHighDensity<br>rdo_params.fast_sb_me = AVC_FastSubBlock_Lev1 | Use the least aggressive Early Exit (EE) thresholds in Inter prediction, leading to fewer Early Exits per picture. ME related: use more extended mv candidates, e.g. global/regional MV from PA. use medium level fast sub block me. |
| −3 | rdo_params.fast_inter = AVC_FastInter_Plus | MD related: with skip mode, and more exhaust inter mode decision. |
| −4 | rdo_params.fast_inter = AVC_FastInter | Always perform sub-MB ME and MD for every block<br>MD related: with even more exhaust inter mode decision, e.g. ME predictors, no intra_likely flag |
| −5 | rdo_prams.rdo_mode = AVC_RDO_Accurate | RDO related: with more accurate RDO, e.g. real rate |
| −6 | rdo_prams.use_satd_in_intra_md = AVC_SatdIntra_on | enables using SATD for intra MD |
| −7 | rdo_prams.use_satd_in_intra_md = AVC_Satd_SubPelME_Ref_on | enables using SATD for inter MD for reference MB |
| −8 | rdo_prams.use_satd_in_intra_md = AVC_Satd_SubPelME_Ref_on<br>rdo_prams.fast_intra = 0 | enables using SATD for inter MD for all MB, and more exhaust intra MD |

In an embodiment, two or more configuration changes which may be made for a particular video module 140 may be ordered dynamically based on such factors as picture types, resolution, frame rates, temporal hierarchy levels and a priori knowledge of the system, e.g., state of the filters. To illustrate, the current picture type may determine the order in which changes in how a particular video module 140 are made. Each type of configuration change may be associated to a particular picture type for which that configuration change is most effective. Indeed, certain configuration changes may only be effective for certain picture types, e.g., changing how motion estimation is performed is not useful when processing intra pictures. If the current picture type is P or B, then most configuration changes to how encoding is performed by a particular video module 140 will be useful. However, if the current picture is an I picture, an embodiment of the invention may reorder how configuration changes are applied, relative to P or B picture type, such that configuration changes most effective for an I picture type are made first to the video module 140 processing the I picture type.

In an embodiment, a priori knowledge of the current state of the configuration of a particular video module 140 and the picture type which the particular video module 140 is currently processing is used to determine how to adjust the configuration of that video module 140 in view of the available CPU resources. To illustrate, if the baseband filters have been turned off for a particular video module 140, then in an embodiment, any ordering of configuration changes to be communicated to that video module 140 by resource allocator 110 does not include the baseband filter.

Some types of configuration changes include one or more other subordinate configuration changes. For example, adjusting the baseband filter may be performed by adjusting various baseband filter controls, such as Noise Reduction and Picture Enhancement. If one of the configuration settings is not enabled/used by the user, then any subordinate configuration changes are not included in any instructions communicated from resource allocator 110 to the corresponding video module 140.

Control Loop

When system 100 is not overloaded, embodiments should be able to operate such that the cycle profiles 150 used to configure the operation of each of video modules 140 allow each of the video modules 140 to provide optimal video quality mode or increase the quality of the underlying channels. Further, video quality should degrade as slowly and smoothly as possible when system 100 is overloaded.

The control loop of an embodiment may be based on a metric, such as the Sender Delta metric, the Leaky Bucket Fall Behind Accumulation metric, or the Fall Behind Compensated Delta metric. TSMOB measures the fullness of the sender buffer 210. When sender buffer 210 runs dry (i.e., TSMOB=0), no packets will be stored in sender buffer 210 for which to send, thus causing an underflow in the time domain. One of the reasons sender buffer 210 could run dry is due to an encoder falling behind and being unable to send packets to sender buffer 210.

The reaction time to an underflow in sender buffer 210 is controlled through a threshold. Typically, Delta (the amount of time to be added to the end-to-end delay to absorb variations in processing time in software systems) is initialized with a value of around 0.6 seconds. When the threshold is set to 0.5 seconds, for example, the minimum reaction time control the underflow in sender buffer 210 is 0.5 seconds. Sender buffer 210 determines the availability of bits for the multiplexer to package in the transport stream. The fullness of sender buffer 210 determines the amount of time needed to fill sender buffer 210 if it is starting to get closer to being empty, i.e., 0 bits. As a result, in this example, there is at most 0.5 seconds from the time sender buffer 210 was full to the time sender buffer 210 becomes empty to make sure that sender buffer 210 stays at optimal level without becoming empty.

Fb_ticks measure how much has a particular video module 140 has fallen behind in work. Similar to Delta, when the fb_ticks threshold is set 0.1 seconds, for example, the amount of video data on which a particular video module 140 has fallen behind in processing will be attempted to be kept under 0.1 seconds. Both of these options for specifying the threshold are limited by how much control for a given situation are provided by the cycle profiles 150.

An embodiment of the invention may employ a control loop using fb_ticks or fall behind as the process variable while driving the setpoint fall behind to 0. A similar approach may be taken by an embodiment that employs signals Delta or Delta_minus_fbticks as process variable and setpoints set to 0.6 seconds for Delta and Delta_minus_f-bticks.

Central Controller

One of the potential problems when a particular video module 140 is falling behind in processing a channel is that occasionally some channels can fall behind more than others. The channels that are running ahead do so typically because the content that are carrying is agreeable to making more compute scalable decisions in the pipeline. On the other hand, the channels which are falling behind typically are carrying relatively difficult content that require more serial coding decisions (for example, a lot of smaller intra modes and/or more cabac bins to renormalize) to be made within a cycle budget that cannot be stretched beyond what has been allocated for that particular channel and more cycle resources cannot be obtained without getting them from the other channels sharing the same set of CPU cores.

One way to obtain more cycle resources for any channel that is falling behind more than the others is through a central entity which can normalize the fall behind of all channels and bring them to the same level of fall behind, thereby freeing up cycles from the channels running faster for the benefit of the slower channels. The slower channels use the normalized value sent by the central controller to free up cycles. The resource allocator 110 assigns to a particular video module 140 processing a channel that is falling behind a different cycle profile 150 which is one step or increment in the direction towards higher density and lower video quality. For example, if a particular video module 140 was previously using a cycle profile associated with a 1 as shown in FIG. 4, then the resource allocator 110, upon receiving the information from the central controller, may instruct that particular video module 140 to use the cycle profile associated with a 2 as shown in FIG. 4, as that cycle profile is one step or increment in the direction towards higher density and lower video quality. However, it is noted that channels running faster when processing less computationally expensive content may get disproportionally hit by a decrease in video quality due to adjusting the cycle profiles employed by video modules 140 processing those channel to be lowest in video quality and higher in density to ensure that the content is processed in a timely manner.

The following set of equations describes the central controller. For each channel sharing a common set of cores, the average fallbehind value may be calculated as:

$$Fbavg = \Sigma Fb[i]/N \text{ for } i=0 \text{ to } N \text{ channels}$$

The normalized feedback is conveyed to each channel by the central controller. Thereafter, the fallbehind of other channels may be adjusted so that the channels can fallbehind more for the benefit of the channel(s) falling behind most. This may be expressed as:

If (Fb<Fbavg)

Set

Fb=Fbavg or

Fb=(1−bias)*Fb+bias*Fbavg

For the control loop to use, where bias is 0<bias<1

Note that adjusting the allowable fallbehind values in this manner will affect the video quality of the channels carrying content that is computational less expensive to process which are running faster than real time or close to real time.

Cycle State Mux

In U.S. patent application Ser. No. 14/961,239 (the '239 application), filed Dec. 7, 2015, entitled "DYNAMIC ALLOCATION OF CPU CYCLES IN VIDEO STREAM PROCESSING", which is hereby incorporated by reference for all purposes as if fully set forth herein, a CPU stream balancer module is responsible for stat muxing the cycles across encoders using their complexity and CPU utilization. Embodiments of the invention recognize that when the complexity of the content increases, the CPU utilization for processing that content at that time instance increases. In statistically multiplexed channels, typically the channels with higher complexity need more bitrate as well need more CPU utilization.

In the below expressions, the complexity of channel, at a time instance t, is represented as $X_{i,t}$ where i is the channel number and t is the time instance. CPU utilization, at time instance t, is represented as $C_{i,t}$ where i the channel number and t is the time instance. CPU utilization of a given channel is proportional to its complexity at that time instance, as shown by:

$$C_{i,t} \alpha X_{i,t}$$

Typically, we modulate the instantaneous ratio between total complexity and the CPU utilization to track the proportional variable $\beta t$ at time instance t. Total complexity at time t is defined as $$X_{total,t} = \Sigma X_{i,t}$$

Total CPU utilization at time t is defined as $$C_{total,t} = \Sigma C_{i,t}$$

The proportional CPU-complexity coefficient variable to modulate the CPU utilization prediction $\beta t$ is calculated as $$\beta_t = C_{total,t}/X_{total,t}$$

The proportional CPU-complexity coefficient variable is filtered with respect to past values using IIR filtering as follows:

$$\beta_{filt,t} = (\beta_t + 7*\beta_{t-1})/8$$

The idle CPU utilization is defined as $$Idle_{total,t} = 100 - C_{total,t}$$

At time t, each encoder (or video module 140) sends the look ahead complexity $LAX_{i,t}$ for first the picture in its look ahead pipeline. Typically, the complexity of the reported picture corresponds to several pictures in the future compared to the one being encoded. Each encoder (or video module 140) also sends the current instantaneous CPU utilization $C_{i,t}$ and complexity of the current picture encoded $X_{i,t}$ to the CPU stream balancer module. Based on this information, the CPU stream balancer module predicts the CPU utilization corresponding to the look ahead complexity $LAX_{i,t}$ for each encoding channel. The total look ahead complexity at time t is defined as $$LAX_{total,t} = \Sigma X_{i,t}$$

The total CPU utilization for the look ahead pictures is calculated as $$CPRED_{total,t} = \beta_{filt,t} * LAX_{total,t}$$

With this information, a determination may be made for $IdlePred_{total,t} = 100 - CPRED_{total,t}$. Note that this value could be either positive or negative, as a negative value indicates future complexities that are likely to overload the system CPU utilization of all the encoders (or video modules 14) in total. This value may used by the control loop of an embodiment as follows:

```
If the IdlePred_total,t < 0
        idleCpuPerc = ( Idle_total,t + 3 * IdlePred_total,t ) / 4
Else if the IdlePred_total,t >= 0
    If Idle_total,t > IdlePred_total,t
            idleCpuPerc = ( Idle_total,t + 3 * IdlePred_total,t ) / 4
    Else
            idleCpuPerc = Idletotal,t
```

This idleCpuPerc is used by the control loop to make adjustments in the cycle profile 150 assigned to an encoder (or video module 150). This provides the CPU utilization based feed forward prediction mechanism to the control loop.

Also in another embodiment, the CPU stream balancer module predicts the fall behind of individual encoder channels based on the look ahead complexity $LAX_{i,t}$ for each encoding channel. A measure of the amount of fall behind of each channel, at time instance t, is represented as $FB_{i,t}$ where i is the channel number and t is the time instance. A measure of the fall behind of a given channel is proportional to its complexity at that time instance, as expressed as:

$$FB_{i,t} \alpha X_{i,t}$$

The total fall behind at time t is defined as $$FB_{total,t} = \Sigma FB_{i,t}$$

A proportional fall behind-complexity coefficient variable to modulate the fall behind prediction $\Delta t$ may be calculated as $$\Delta t = FB_{total,t}/X_{total,t}$$

The proportional fall behind-complexity coefficient variable is filtered with respect to past values using IIR filtering as follows:

$$\Delta_{filt,t} = (\Delta_t + 7*\Delta_{t-1})/8$$

At time t, each encoder (or video module 140) sends the look ahead complexity $LAX_{i,t}$ for first the picture in its look ahead pipeline to the CPU stream balancer module. Typically the complexity of the reported picture corresponds to several pictures in the future compared to the one being encoded. Each encoder (or video module 140) also sends, to the CPU stream balancer module, the current instantaneous fall behind $FB_{i,t}$ and complexity of the current picture encoded $X_{i,t}$. Based on this information, the CPU stream balancer module predicts the fall behind corresponding to the look ahead complexity $LAX_{i,t}$ for each encoding channel as follows:

$$FBPRED_{total,t} = \Delta_{filt,t} * LAX_{total,t}$$

The fall behind for each encoding channel may be predicted as $$FBPRED_{i,t} = FBPRED_{total,t} * LAX_{i,t} / LAX_{total,t}$$

The fall behind for each encoding channel may be used by the control loop as a feed forward prediction. In doing so, the expression $\Delta_{filt,t} = (\Delta_t + 7*\Delta_{t-1})/8$ may be restated as:

```
If fb_ticks[n] < FBPRED_{i,t}
        Offset = Kp * (fb_ticks[n]+ FBPREDi,t) + Ki *
        fbticks_acc[n] + Kd * Delta_fbticks[n]
Else
        Offset = Kp * fb_ticks[n] + Ki * fbticks_acc[n] + Kd *
        Delta_fbticks[n]
```

The above procedure improves the stability of the control loop and does not wait for an error from setpoint before corrective actions are taken. This is so because the disturbance is predicted before it enters the system, and this information is used to take corrective action before the disturbance has influenced the system. The effect of the disturbance is thus reduced by predicting it and generating a control signal that counteracts it before its influence is felt on the system.

Socket and Thread Balancing

Compute units are typically grouped into Groups of CPUs (sockets) with access to the same memory resources. A transcoder instance can be restricted to allocate its processing threads to cores of a specific Group of CPUs (socket) to reduce potential memory copying across Groups of CPUs. If such restriction is more efficient, then distributing a number of transcode instances (of different resolutions, configurations, and content) among a number of CPU groups requires load balancing in run-time, to avoid endemic cases where one CPU group (socket) is overloaded all the time, while the others are under-utilized. In doing so, an embodiment may adjust CPU groups so that, as best possible, each CPU group is employing the same or similar cycle profile 150.

After transcode instances are initially allocated at system start-up, the following procedure may be performed by embodiments to periodically re-balance the channels in run-time.

First, a measure of the average cycle profile 150 identifier (i.e, one of the identifying numbers shown in FIG. 4) for each channels on each socket is taken over a five minute window. LEVEL[ii][jj] expresses the average cycle profile identifier for channel jj, restricted to socket ii.

Next, CPU groups are ordered in descending order of their avgLEVEL[ii] (average cycle profile identifer for channels restricted to socket ii) where avgLEVEL[0]>avgLEVEL[1]>...>avgLEVEL[n-1], where n is the number of distinct CPU groups.

Then, Channel on each CPU group [ii], with the lowest average knob level over the previous five minute window is identified as Lowest[ii]. Channel on each CPU group [ii], with the highest average knob level over the previous five minute window is identified as Highest[ii]. Number of encode/transcode services running on each CPU group is identified as numServices[ii].

Finally, rebalancing will be described in the form of pseudo-code according to an embodiment:

```
for (int ii=0; i<(n/2); i++) {
if ( ((avgLEVEL[ii] – avgLEVEL[n-1-ii]) > 2) && (numServices[ii] <=
numServices[n-1-ii]) ) {
        Switch Lowest[n-1-ii] to CPU group (ii);
        Switch Highest[ii] to CPU group (n-1-ii);
}
if ( ((avgLEVEL[ii] – avgLEVEL[n-1-ii]) > 2) && (numServices[ii] >
numServices[n-1-ii]) ) {
        Switch Lowest[ii] to CPU group (n-1-ii);
}
}
```

As shown above, video modules 140 may be restricted by grouping or physical resource allocation (i.e., how CPUs are arranged in a socket) that restrict their ability to freely access resources across sockets. As a consequence, until more resources can be allocated to the video module 140 outside of this socket, the video module 140 will need to have it assigned cycle profile 150, which controls its operaton, to be adjusted to accomodate the resources avaialble to the socket until the resources become available.

Threads are another example of resources which need to be balanced between overallocation and associated overhead. Each cycle profile 150 requires a different allocation of threads to achieve the processing configuration defined by that cycle profile. Each cycle profile 150 specifices configuration changes for a video module 150 which can adjust a varity of factors such as bitrate, frame rate, resolution, and codec. Consequently, embodiments of the invention also ensure that resource allocator 110 considers thread availability, overallocation, and associated overhead when adjusting which cycle profile 150 to assign to a particular video module 150.

Hardware Mechanisms

Figure 5:
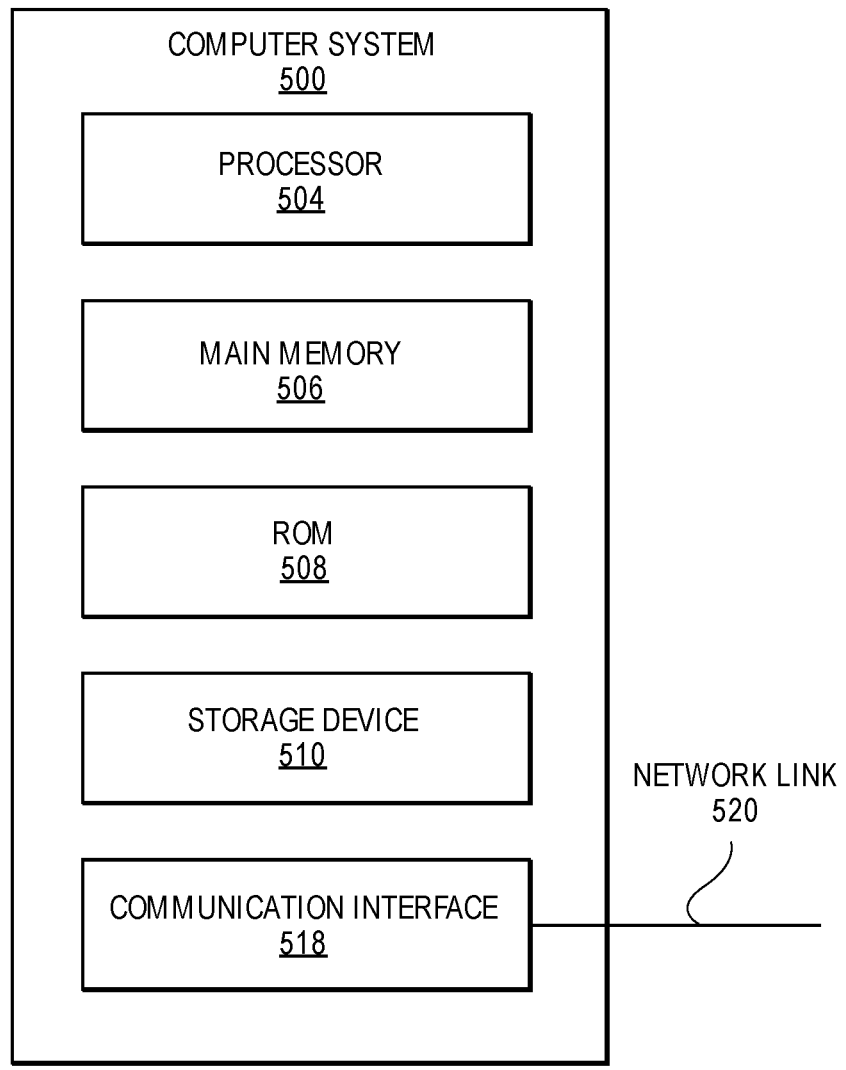
FIG. 5 is a block diagram that illustrates a computer system upon which an embodiment of the invention may be implemented.

In an embodiment, hardware device 120 of FIG. 1 may be implemented on or correspond to a computer system. FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in persistently storing instructions which may be provided to processor 504 for execution. Non-limiting, illustrative examples of non-transitory computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for dynamically allocating CPU cycle resources to a video encoder, which when executed by one or more processors, cause:

a resource allocator, executing on a hardware device, assessing an amount of available CPU cycle resources of two or more groups of Central Processing Units (CPUs) on said hardware device;

upon the resource allocator determining a change in said amount of available CPU cycle resources, adjusting, in real-time, which particular cycle profile, in a plurality of cycle profiles, is assigned to at least one of a plurality of video modules, wherein said plurality of cycle profiles each allocate, to members of said plurality of video modules, a particular amount CPU cycle resources for processing digital video, wherein group members of the same group in said two or more groups of CPUs have access to the same set of memory resources, and wherein said plurality of cycle profiles each specify a set of configuration settings and are arranged in a sequence based upon video quality and density achievable by members of said plurality of video modules using configuration settings associated with each of said plurality of cycle profiles in processing digital video; and in response to assigning a different cycle profile to a particular video module, rebalancing, in runtime, a set of channels assigned to each group of said two or more groups of CPUs so that, as best possible, each member of each group of said two or more groups of CPUs is servicing video modules assigned to the same or similar cycle profile of said plurality of cycle profiles.

2. The non-transitory computer-readable storage medium of claim 1, wherein execution of the one or more sequences of instructions further cause:

in response to adjusting, in real-time, the particular cycle profile assigned to said at least one video module, said at least one video module processing a particular digital video frame in a video stream using a different set of configuration settings than adjacent frames.

3. The non-transitory computer-readable storage medium of claim 1, wherein execution of the one or more sequences of instructions further cause:

in response to adjusting, in real-time, the particular cycle profile assigned to said at least one video module, said at least one video module processing a particular macroblock using a different set of configuration settings than at least one other macroblock in the same frame of digital video.

4. The non-transitory computer-readable storage medium of claim 1, wherein the particular cycle profile assigned to said at least one video module allocate additional CPU cycle resources to said at least one video module than what is assigned by default to a mode in which said at least one video module operate for purposes of improving video quality beyond that associated with said mode.

5. The non-transitory computer-readable storage medium of claim 1, wherein execution of said one or more sequences of instructions further cause:
   said resource allocator instructing a particular video module, of said plurality of video modules, to change its behavior to fluctuate between operating in accordance with a high quality (HQ) mode and a high density (HD) mode in response to changes in said available CPU cycle resources.

6. The non-transitory computer-readable storage medium of claim 1, wherein execution of said one or more sequences of instructions further cause:
   said resource allocator instructing a particular video module, of said plurality of video modules, to change a level in video quality in processed digital video produced by said particular video module in response to changes in said available CPU cycle resources.

7. The non-transitory computer-readable storage medium of claim 1, wherein adjusting, in real-time, which particular cycle profile is assigned to at least one of a plurality of video modules comprises:
   the resource allocator identifying that said at least one of said plurality of video modules should be assigned a new cycle profile in response to detecting an underflow condition in a sender buffer of said at least one of said plurality of video modules.

8. The non-transitory computer-readable storage medium of claim 1, wherein adjusting, in real-time, which particular cycle profile is assigned to at least one of a plurality of video modules comprises:
   the resource allocator identifying that said at least one of said plurality of video modules should be assigned a new cycle profile in response to measuring differences between an encoding time per picture with respect to an expected encode time per picture for each of said at least one of said plurality of video modules.

9. An apparatus for dynamically allocating CPU cycle resources to a video encoder, comprising:
   one or more processors; and
   one or more non-transitory computer-readable storage mediums storing one or more sequences of instructions, which when executed, cause:
      a resource allocator, executing on a hardware device, assessing an amount of available CPU cycle resources of two or more groups of Central Processing Units (CPUs) on said hardware device;
      upon the resource allocator determining a change in said amount of available CPU cycle resources, adjusting, in real-time, which particular cycle profile, in a plurality of cycle profiles, is assigned to at least one of a plurality of video modules,
      wherein said plurality of cycle profiles each allocate, to members of said plurality of video modules, a particular amount CPU cycle resources for processing digital video,
      wherein group members of the same group in said two or more groups of CPUs have access to the same set of memory resources, and
      wherein said plurality of cycle profiles each specify a set of configuration settings and are arranged in a sequence based upon video quality and density achievable by members of said plurality of video modules using configuration settings associated with each of said plurality of cycle profiles in processing digital video; and
      in response to assigning a different cycle profile to a particular video module, rebalancing, in runtime, a set of channels assigned to each group of said two or more groups of CPUs so that, as best possible, each member of each group of said two or more groups of CPUs is servicing video modules assigned to the same or similar cycle profile of said plurality of cycle profiles.

10. The apparatus of claim 9, wherein execution of the one or more sequences of instructions further cause:
    in response to adjusting, in real-time, the particular cycle profile assigned to said at least one video module, said at least one video module processing a particular digital video frame in a video stream using a different set of configuration settings than adjacent frames.

11. The apparatus of claim 9, wherein execution of the one or more sequences of instructions further cause:
    in response to adjusting, in real-time, the particular cycle profile assigned to said at least one video module, said at least one video module processing a particular macroblock using a different set of configuration settings than at least one other macroblock in the same frame of digital video.

12. The apparatus of claim 9, wherein the particular cycle profile assigned to said at least one video module allocate additional CPU cycle resources to said at least one video module than what is assigned by default to a mode in which said at least one video module operate for purposes of improving video quality beyond that associated with said mode.

13. The apparatus of claim 9, wherein execution of said one or more sequences of instructions further cause:
    said resource allocator instructing a particular video module, of said plurality of video modules, to change its behavior to fluctuate between operating in accordance with a high quality (HQ) mode and a high density (HD) mode in response to changes in said available CPU cycle resources.

14. The apparatus of claim 9, wherein execution of said one or more sequences of instructions further cause:
    said resource allocator instructing a particular video module, of said plurality of video modules, to change a level in video quality in processed digital video produced by said particular video module in response to changes in said available CPU cycle resources.

15. The apparatus of claim 9, wherein adjusting, in real-time, which particular cycle profile is assigned to at least one of a plurality of video modules comprises:
    the resource allocator identifying that said at least one of said plurality of video modules should be assigned a new cycle profile in response to detecting an underflow condition in a sender buffer of said at least one of said plurality of video modules.

16. The apparatus of claim 9, wherein adjusting, in real-time, which particular cycle profile is assigned to at least one of a plurality of video modules comprises:
    the resource allocator identifying that said at least one of said plurality of video modules should be assigned a new cycle profile in response to measuring differences between an encoding time per picture with respect to an expected encode time per picture for each of said at least one of said plurality of video modules.

17. A method for dynamically allocating CPU cycle resources to a video encoder, comprising:
    a resource allocator, executing on a hardware device, assessing an amount of available CPU cycle resources of two or more groups of Central Processing Units (CPUs) on said hardware device;

upon the resource allocator determining a change in said amount of available CPU cycle resources, adjusting, in real-time, which particular cycle profile, in a plurality of cycle profiles, is assigned to at least one of a plurality of video modules, wherein said plurality of cycle profiles each allocate, to members of said plurality of video modules, a particular amount CPU cycle resources for processing digital video, wherein group members of the same group in said two or more groups of CPUs have access to the same set of memory resources, and wherein said plurality of cycle profiles each specify a set of configuration settings and are arranged in a sequence based upon video quality and density achievable by members of said plurality of video modules using configuration settings associated with each of said plurality of cycle profiles in processing digital video; and in response to assigning a different cycle profile to a particular video module, rebalancing, in runtime, a set of channels assigned to each group of said two or more groups of CPUs so that, as best possible, each member of each group of said two or more groups of CPUs is servicing video modules assigned to the same or similar cycle profile of said plurality of cycle profiles.

18. The method of claim 17, wherein the particular cycle profile assigned to said at least one video module allocate additional CPU cycle resources to said at least one video module than what is assigned by default to a mode in which said at least one video module operate for purposes of improving video quality beyond that associated with said mode.

19. The method of claim 17, further comprising:

said resource allocator instructing a particular video module, of said plurality of video modules, to change its behavior to fluctuate between operating in accordance with a high quality (HQ) mode and a high density (HD) mode in response to changes in said available CPU cycle resources.

20. The method of claim 17, further comprising:

said resource allocator instructing a particular video module, of said plurality of video modules, to change a level in video quality in processed digital video produced by said particular video module in response to changes in said available CPU cycle resources.

* * * * *